C. I. LONGENECKER.
SIDE DUMP TRUCK.
APPLICATION FILED JUNE 8, 1917.
1,260,560.
Patented Mar. 26, 1918.
2 SHEETS—SHEET 2.
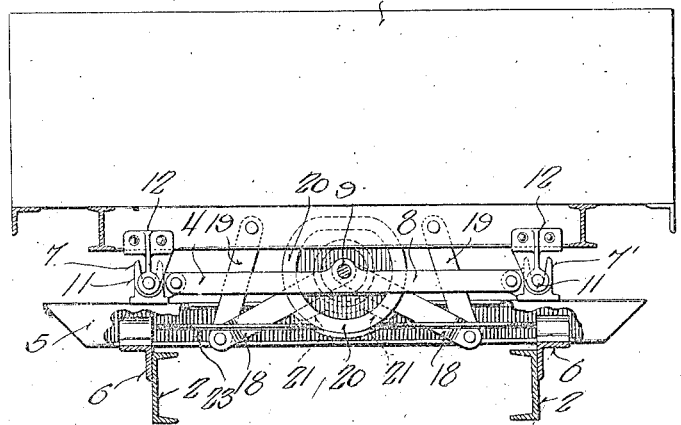
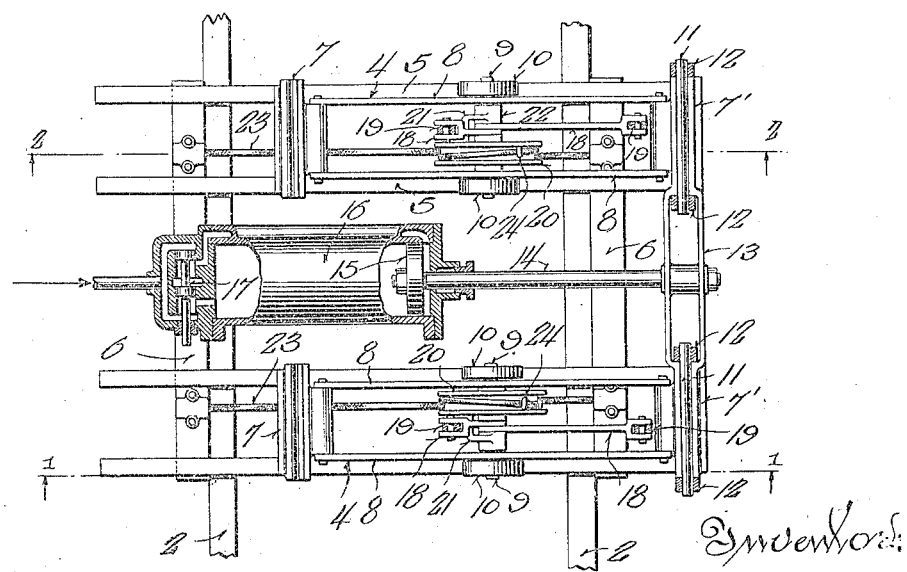

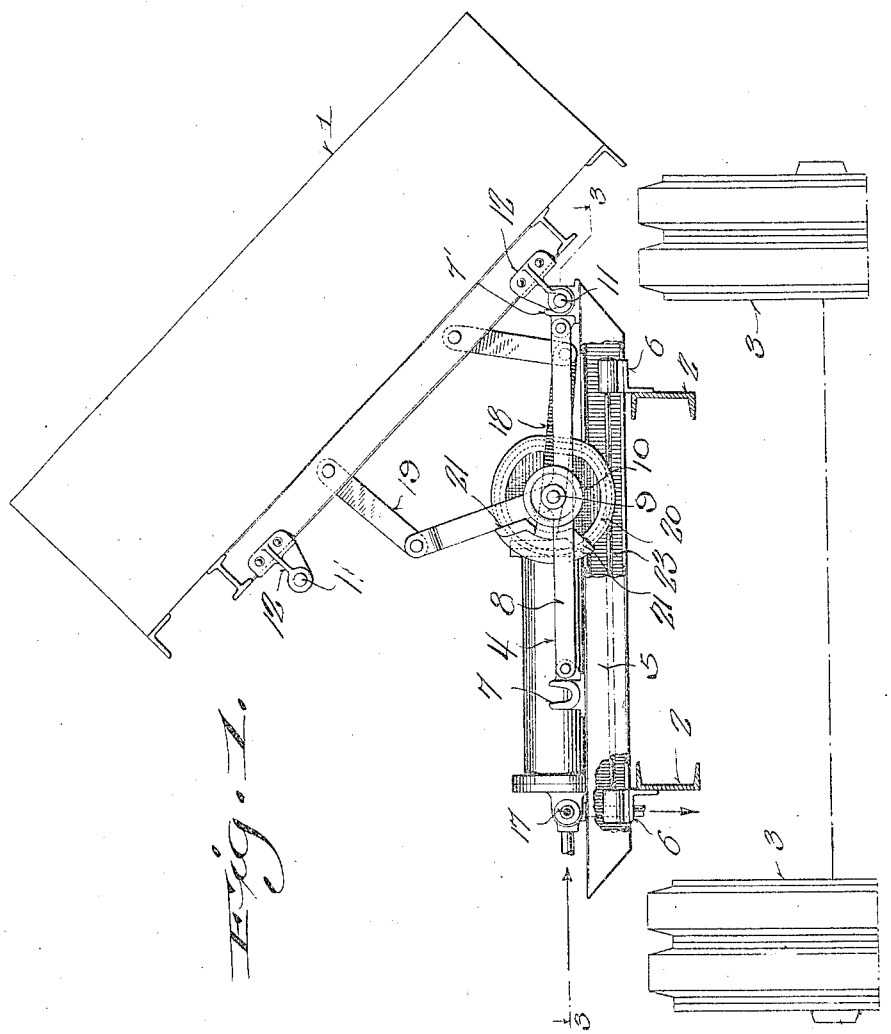

UNITED STATES PATENT OFFICE.

CHARLES I. LONGENECKER, OF MILWAUKEE, WISCONSIN.

SIDE-DUMP TRUCK.

1,260,560.

Specification of Letters Patent. Patented Mar. 26, 1918.

Application filed June 8, 1917. Serial No. 173,507.

*To all whom it may concern:*

Be it known that I, CHARLES I. LONGE-NECKER, a citizen of the United States, and resident of Milwaukee, in the county of Milwaukee and State of Wisconsin, have invented certain new and useful Improvements in Side-Dump Trucks; and I do hereby declare that the following is a full, clear, and exact description thereof.

My invention relates to new and useful improvements in means for tilting the bodies of dump vehicles for the purpose of discharging material therefrom.

One object of the present invention resides in the novel means whereby the fulcrum point upon which the dump body is to be rocked may be shifted in different directions with respect to the relatively stationary vehicle frame to dispose the discharge end of the body outwardly and at a distance from the adjacent side of said vehicle frame. Such an arrangement may be used on either end or side dump trucks.

An additional important object is to provide a side dump truck whose body may be tilted in either direction to discharge the material toward either side of the truck.

It is also an object to provide means for simultaneously shifting the fulcrum point of the dump body and tilting said body.

A less important object consists in providing an improved carriage for mounting the body on the vehicle frame whereby to reduce friction to a minimum when the parts are moved relative to one another.

With these and many other objects in view the invention consists in the novel features of construction, combination and arrangement of parts which will be hereinafter more particularly described and claimed, and shown in the drawings wherein:

Figure 1 represents a vertical transverse section through a truck frame having a side dump body mounted thereon, said body being tilted by means constructed in accordance with my invention.

Fig. 2 is a view similar to Fig. 1, but showing the dump body in lowered or normal position, said section being indicated by the line 2—2 of Fig. 3, and Fig. 3 is a horizontal section taken on the line 3—3 of Fig. 1.

In the present embodiment of my invention I have illustrated the same combined with the body frame and dump receptacle of an ordinary side-dump truck, but it is obvious that substantially the same structure could be used in connection with an end dump truck for tilting the body thereon. Referring to the invention, numeral 1 designates a dump receptacle which is carried upon a vehicle body frame including a pair of longitudinally extending spaced side bars 2, said frame being disposed, as is customary, upon axles supported by suitable ground engaging wheels 3.

As hereinbefore indicated, it is desirable to have the dump receptacle 1 moved laterally with respect to the body frame and out of its normal position when it is to be tilted. The main advantage of such movement is to permit the discharge end of the receptacle to readily clear the wheels 3, which are usually of considerable diameter in heavy trucks. In other words the fulcrum point for the receptacle is moved outwardly toward the side of the body frame from which it is desired to discharge material within said receptacle. This is carried out by provision of one or more carriages 4, in the present instance two being used, which are slidably disposed upon pairs of spaced tracks in the form of channeled bars 5. These tracks in said dump truck are placed transversely of the body frame and the side bars 2 thereof and are secured to reinforcing bars 6, as shown particularly in Fig. 3. The carriages are preferably spaced apart as shown in this figure to permit a suitable carriage shifting mechanism, which will later be described, to be placed therebetween. Each of the carriages is of a length approximately equal to the distance between the side bars 2, and each includes a pair of end members which are in the form of fulcrum blocks 7 and 7', side bars 8 pivotally connecting the fulcrum blocks, a pivot shaft 9 extending through the side bars and journally mounted therein, and rollers 10 on the outer ends of said shaft for engagement with the tracks 5. The fulcrum blocks 7 and 7' also engage the tracks 5, but the major portion of the weight of the dump receptacle is borne by the roller.

When in normal position the dump receptacle rests upon the pair of carriages, being in engagement therewith at spaced points, said points of contact being between the fulcrum blocks and pivot rods 11 carried by the under side of the receptacle. From the several figures of the drawing it will be noticed that the fulcrum blocks are provided with open seats to permit the pivot rods to be readily introduced or removed, and that said pivot rods are of the length substantially equal to the length of said blocks. The ends of the pivot rods are held in suitable hangers 12 depending from the dump receptacle, and these hangers engage the ends of the fulcrum blocks when the pivot rods are disposed therein to prevent longitudinal shifting of the dump receptacle with respect to its carriages. The fulcrum blocks have depending portions for disposition between the tracks 5 to serve the same purpose between the carriages and the body frame.

In order that the carriages and the receptacle may be shifted transversely of the body frame in either direction, one end of each carriage is connected with a suitable cross head 13 which is secured to the outer end of a piston rod 14. The opposite end of the piston rod carries a head 15 which is slidably positioned within a fluid cylinder 16, said cylinder being disposed between the two pairs of tracks 5 as previously set forth. When the carriages and the dump receptacle are in their normal position midway the sides of the body frame, the head 15 of the piston is positioned midway the ends of the cylinder 16. When it is desired to shift the dump receptacle, a valve 17 is actuated in the proper direction to permit the compressed fluid to enter one end of the cylinder and to allow fluid in the opposite end to to be discharged. Upon movement of the valve in the opposite direction the cross head will be moved by the piston head to position the carriages at the opposite side of the body frame.

For the purpose of tilting the dump receptacle to either one side or the other, the intermediate portions of the same between the pivot rods 11 are linked to the shafts 9. For instance upon each of the shafts a pair of links 18 are pivoted, the free ends of these links being similarly connected with additional links 19, which are fulcrumed at spaced points to the under side of the dump receptacle 1. When said receptacle is in lowered inactive position the links 18 and 19 are as shown in Fig. 2, and it is obvious that upon elevation of either of the links 18 said receptacle will be tilted upon one of its fulcrum points formed by the blocks 7 and 7' and the pivot rods 11.

The means for elevating the links 18 consists of a pair of sheaves 20, one of which is disposed on each of the shafts 9 intermediate the side bars 8 of the carriages. From one side of each of the sheaves a pair of spaced arms 21 extend, the outer ends of these arms being connected with collars 22 also positioned on said shafts 9. These collars are designed to add the required strength to the arms 21, and from Fig. 3 it will be seen that they are spaced from the sheaves to receive the ends of the links 18 therebetween, thereby forming a very compact and strong arrangement. It is obvious that upon rotation of the sheaves in either direction one of the arms 21 thereof will engage one set of links 18, and thus tilt the receptacle in one direction. The receptacle may be tilted to the other side of the body frame by rotation of the sheaves in the opposite direction.

Such rotation of the sheaves is occasioned by a pair of cables 23, one of which is disposed around each sheave. The opposite ends of these cables are fixed to the reinforcing bars 6, while the intermediate portions thereof are attached to the sheaves as at 24. When the cross head 13 is now moved it is obvious that the carriages will be shifted laterally of the body frame and that the dump receptacle will be simultaneously tilted, the direction of tilting being toward the side of the body frame to which the carriages have been moved, as is clearly obvious from examination of Figs. 1 and 2. The dump receptacle is thus readily rocked on either of its pair of spaced pivots, and is caused to clear the wheels 3 of the truck, as would not be possible were said pivot points to remain stationary, unless they were positioned a considerable distance above the wheels.

When the tilted receptacle is ready to be lowered the valve control means shown in my co-pending application, Serial No. 171,104, filed May 26, 1917, is actuated to permit the receptacle to move to its inactive position by the action of gravity. The valve 17 is adapted merely for changing the direction of movement of the carriages on which the receptacle is mounted.

I claim:—

1. In a mechanism of the class described, a body frame, a dump receptacle, a pivotal connection between said frame and receptacle, a pivot shaft carried by the frame, a link loosely mounted on the pivot shaft and connected to the receptacle, a rotatable member on the pivot shaft, means on the member engageable with said link, and means for rotating the member to actuate the link and elevate the receptacle.

2. In a mechanism of the class described, a body frame, a dump receptacle, a pivotal connection between said frame and receptacle, a pivot shaft carried by the frame, a link loosely mounted on the pivot shaft and connected with the receptacle, a rotatable member, a flexible connection disposed around said member and fixed to the frame, means on the member engageable with the link, and means for rotating the member to actuate the link and elevate the receptacle.

3. In a mechanism of the class described, a body frame, a pair of spaced fulcrum blocks on said frame, a dump receptacle adapted to tilt on either of said blocks, a pivot shaft carried by the frame, a pair of links loosely pivoted on the shaft at one end, the other ends being connected at spaced points with the receptacle, a rotatable member, means on the member for selectively engaging either of said links, a flexible connection disposed around said member and fixed to the frame, and means for rotating the member in either direction for selectively tilting the receptacle on either of its fulcrum blocks.

4. In a mechanism of the class described, a body frame, a track thereon, a carriage movable on the track and including a pair of side bars, a pivot shaft carried by the bars and rollers on the shaft for engagement with said track, a rotatable member mounted on the pivot shaft, a flexible connection disposed around said member and fixed to the frame, and means for rotating the member whereby to move the carriage with respect to the frame.

5. In a mechanism of the class described, a body frame, a track thereon, a carriage movable on the track and including a pair of side bars, a pivot shaft carried by the bars, and rollers on the shaft for engagement with the track, a receptacle pivoted to the carriage and movable therewith, a sheave on the pivot shaft, a connection between the sheave and receptacle, and means for rotating the sheave to simultaneously shift the receptacle with respect to the frame and to tilt the same.

6. In a mechanism of the class described, a body frame, a pair of spaced fulcrum blocks on the frame, a dump receptacle adapted to rest on the blocks, a pair of links pivotally connected at one end with the frame, their other ends being connected with the receptacle at spaced points, and means selectively engageable with either of said links to tilt the receptacle on either of said fulcrum blocks.

7. In a mechanism of the class described, a body frame, a pair of spaced fulcrum blocks on the frame, a dump receptacle adapted to rest on the blocks, a pair of links pivotally connected at one end with the frame, their other ends being connected with the receptacle at spaced points, a rotatable member engageable with said links, and means selectively for rotating the member in either direction to engage either of the links to tilt the receptacle on either of said fulcrum blocks.

8. In a mechanism of the class described, a body frame, a pair of spaced fulcrum blocks slidable on the frame, a dump receptacle adapted to rest on the blocks, a pair of links pivotally attached at one end with the sliding fulcrum blocks, their other ends being connected with the receptacle, a rotatable member connected with the fulcrum blocks and engageable with either of said links, a connection between the rotatable member and the frame, and means for rotating the member in either direction to engage either of said links to tilt the receptacle in either direction and simultaneously shift the same with respect to the frame.

9. In a mechanism of the class described, a body frame, a carriage movable thereon and including a pair of spaced fulcrum blocks, a pair of side bars connected with said blocks, and a pivot shaft carried by said side bars, a dump receptacle adapted to rest on said fulcrum blocks, a pair of links pivotally attached to said shaft at one end, their opposite ends being connected with the receptacle, a rotatable member on the pivot shaft and engageable with either of said links, a connection between the rotatable member and the frame, and means for rotating the member in either direction to engage either of said links to tilt the receptacle in either direction and simultaneously shift the same with respect to the frame.

10. In a mechanism of the class described, a body frame, a carriage movable thereon and including a pair of spaced fulcrum blocks, a pair of side bars connected with said blocks, and a pivot shaft carried by said side bars, a dump receptacle adapted to rest on said fulcrum blocks, a pair of links pivotally attached to said shaft at one end, their opposite ends being connected with the receptacle, means engageable with either of said links to tilt the receptacle on either of said fulcrum blocks, and means for shifting the carriage in either direction.

11. In a mechanism of the class described, a body frame, a carriage movable thereon and including a pair of spaced fulcrum blocks, a pair of side bars connected with said blocks, and a pivot shaft carried by said side bars, a dump receptacle adapted to rest on said fulcrum blocks, a pair of links pivotally attached to said shaft at one end, their opposite ends being connected with the receptacle, a rotatable member on the pivot shaft and engageable with either of said links, means for rotating the member in either direction to engage either of the links to tilt the receptacle, and means for shifting said receptacle with respect to the frame.

12. In a mechanism of the class described, a body frame, a pair of spaced fulcrum blocks slidable on the frame, a dump receptacle adapted to rest on the blocks, a pair of links pivotally connected with the sliding fulcrum blocks, said links also being connected with the receptacle, a rotatable member connected with the fulcrum blocks and engageable with either of said links, a cable disposed around said rotatable member and secured intermediate its ends thereto, the opposite ends of said cable being fixed to said body frame, and means for moving the rotatable member in either direction to simultaneously actuate one of said links for tilting the receptacle.

13. In a mechanism of the class described, a body frame, a carriage movable on said frame and including a pair of spaced fulcrum blocks, a pair of side bars connecting said blocks, and a pivot shaft mounted in said side bars, a dump receptacle adapted to rest on said fulcrum blocks, a pair of links pivotally connected at one end with said pivotal shaft, a second pair of links, one end being pivoted to the receptacle at spaced points, a rotatable member disposed on said pivot shaft, means carried by said rotatable member for engaging either of the first mentioned links, a connection between the rotatable member and the body frame, and means for moving the carriage to simultaneously rotate said member for actuating certain of said links to tilt the receptacle.

In testimony that I claim the foregoing I have hereunto set my hand, at Milwaukee, in the county of Milwaukee and State of Wisconsin.

CHARLES I. LONGENECKER.